Figure 1:
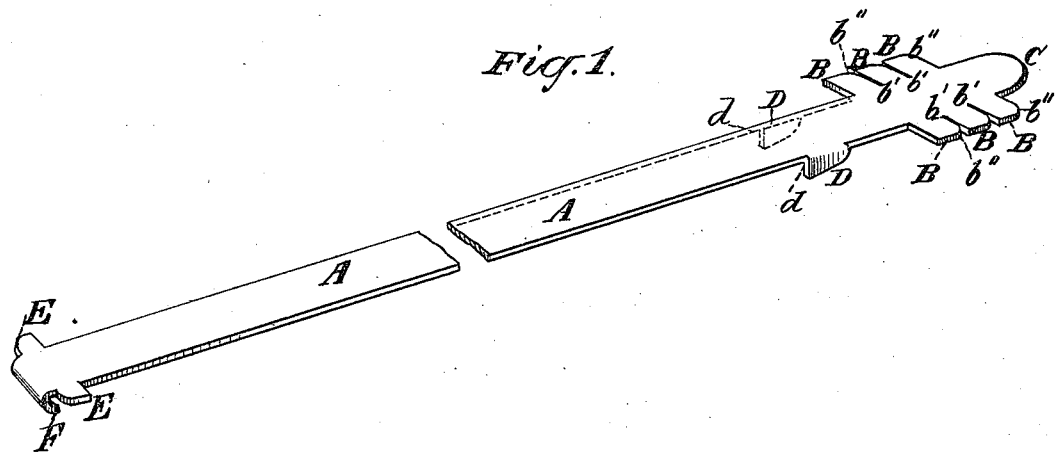

(No Model.)

G. SCHRADER & J. SCHMITT.
CLAMP FOR HOSE COUPLINGS.

No. 356,083. Patented Jan. 11, 1887.

WITNESSES.
John Becker
Jno. E. Gavin

INVENTORS
George Schrader
Joseph Schmitt
by Chas. M. Higgins
attorney

UNITED STATES PATENT OFFICE.

GEORGE SCHRADER, OF NEW YORK, AND JOSEPH SCHMITT, OF BROOKLYN, N. Y., ASSIGNORS TO A. SCHRADER & SON.

CLAMP FOR HOSE-COUPLINGS.

SPECIFICATION forming part of Letters Patent No. 356,083, dated January 11, 1887.

Application filed May 16, 1886. Serial No. 195,393. (No model.)

*To all whom it may concern:*

Be it known that we, GEORGE SCHRADER, of New York city, county and State of New York, and JOSEPH SCHMITT, of Brooklyn, county of Kings, and State of New York, have jointly invented an Improvement in Clamps for Hose-Couplings; and we do hereby declare that the following is a full, clear, and exact description of the same, reference being had to the accompanying drawings, forming part of this specification.

Our invention is designed to increase the adjustability of clamps for hose-couplings, and to provide a readier means for performing the operation of clamping the same, whereby the clamp may be made capable of use not only for hose of different sizes, but adjustable for such variations in the outside diameter of hose as arise from slight differences in the thickness of ply.

It is frequent that slight differences in thickness of ply, especially in hose of many ply, accumulate in forming the hose to such an extent as to make the outside circumference, which the clamp must clasp in attaching the coupling, vary considerably. For instance, in a four-ply hose, the standard thickness of ply being one-eighth of an inch, the outside circumference would be in a three-inch hose $(3 + \frac{1}{2} + \frac{1}{2}$ inches$) \times 3.1416 = 12.5664$ inches. A variation of one sixty-fourth of an inch in the thickness of the ply would make a difference in the outside circumference of $(\frac{4}{64}$ inch $+ \frac{4}{64}$ inch$) \times 3.1416 = 0.3927$ inch, or a little over twenty-five sixty-fourths of an inch, and as the thickness of each ply is as likely to be less than the standard as to be more, the variation of outside circumference in a four-inch hose may vary, through a variation of one sixty-fourth inch thickness of ply, from 12.9591 inches to 12.1737 inches, making a difference in such circumference of over three-fourths of an inch to be compensated for by the clamp. In order that a clamp may provide for such a difference, and also be adapted to different sizes of hose, it will be seen that a wide range of adjustability in such clamp is needed, and this our invention supplies.

In the clamps for hose-couplings as hitherto constructed, with side lugs at one extremity and side lugs or hooks at the opposite extremity for engaging with each other for clamping the clamp upon the body of the hose to fasten the same to the coupling, a space of considerable width—at least the width of the opposing lugs—has been left, in order that the hooks or lugs which engage them may pass through between such space to make their engagement. In this construction of the clamps it will be seen that the delicacy of the adjustment is limited to the width of one of the lugs plus the width of the space between it and the next lug in order—that is to say, in tightening the clamp, if its engagement with one of the lugs be found to be not sufficiently tight, it is necessary to draw the engaging hook or lug past the space between the adjacent lugs and another lug before another engagement can be made.

In our invention the lugs are arranged in lateral series close to each other, no space being left between their bases or points of junction with the body of the clamp, the engagement of these lugs with the opposing lugs at the opposite end of the clamp being done by bending them down over the body of the clamp, as will be hereinafter more fully set forth.

Figure 2:
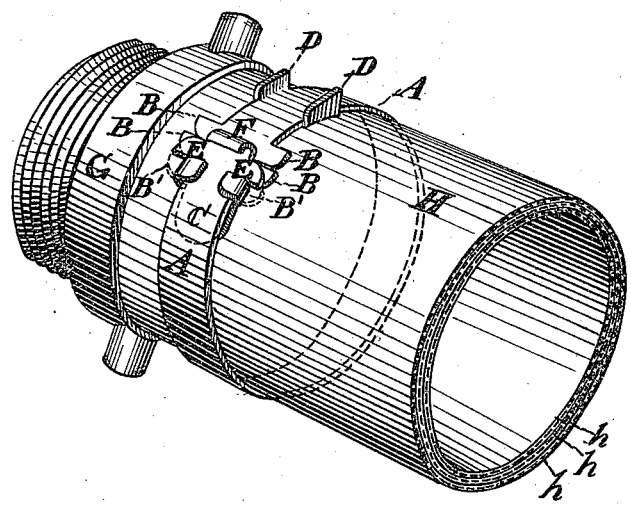
Figure 3:
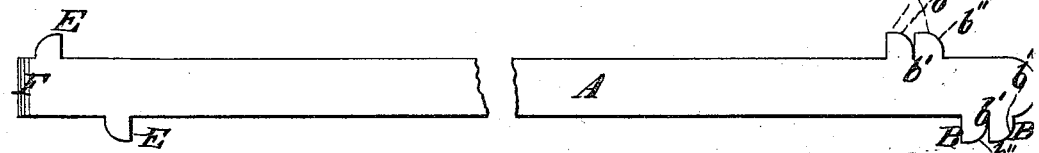

Figure 1 of the drawings represents the clamp before it is bent into the circular form, with the portions of the middle part broken out in order to show the essential parts of a sufficient size for clearness of illustration. Fig. 2 represents a portion of a three-ply hose attached to a coupling by the clamp. Fig. 3 is a representation of a modification of the improvement, which, however, involves the same essential principles of construction as the example illustrated in Figs. 1 and 2.

A, Fig. 1, represents the body of the clamp, which may be formed by punching from sheet metal, or may be of cast metal, or otherwise made in any suitable manner which is efficient and economical. On the sides of one end of the body of the clamp are projections B, which are separated by the cuts $b'$, which may be made simultaneously with the act of punching, or may be formed subsequently to the act of punching, or in any other suitable manner. The cuts $b'$ are made by a sharp cutting-instrument in such manner that no material space between one lug and the next in the series is formed. This leaves the projections $b$ on either side of the body of the clamp closely juxtaposed, so that in passing from one projection to the next in order in the series in tightening the clamp upon the hose and coupling it is necessary only to contract the clamp through a distance equal to the width of one of the lugs $b$—an important distinction between this invention and others which have preceded it, in which a space between the laterally-projecting lugs is left equal to the width of one of the lugs, necessitating the tightening of the clamp for each adjustment through a distance equal to the width of one of the lugs plus the space between the lugs.

The projections B are rectangular in form; but their outer angles, $b''$, are truncated or of rounded form, as shown in Figs. 1 and 2. The purpose of the truncating or rounding of these angles is to make it more convenient to get hold of these projections in turning them down to fasten the clamp, as will be hereinafter described.

The end of the body of the clamp extends some distance beyond the projections B, and is rounded off to finish the same, as shown at C, Figs. 1 and 2. At the opposite end of the body of the clamp are two projections or lugs, E, which preferably have the form of quarter-circles, the circumferential part of which faces the extremity of the clamp. At a convenient distance from the projections B are two lugs, D, formed on the sides of the body A, and turned down at right angles with the plane of the said body, having curvilinear faces toward the end of the clamp C, but having their opposite faces, $d$, at or nearly at right angles with the sides of the body A. At the end of the clamp opposite C is a projection, F, formed by turning down the end of the clamp which projects beyond the lugs or projections E. The projection F is turned in the same direction as that of the lugs or projections D, so that when the band is bent into a circle in such manner that the projections D are on the outside of the circle the projection F will also be on the outside of the circle, as shown in Fig. 2.

The object of the projections D and F is to afford a convenient and strong purchase or bearing for a clamping-instrument in applying the clamp to the hose and coupling. Said clamping-instrument may be pipe-tongs, hand-vise, or any other suitable means by which the projections D and F may be engaged and pressed toward each other until a pair of the projections B are turned down behind the projections E for permanently fastening the clamp, as shown in Fig. 2.

In Fig. 2, G represents the coupling; H, a portion of a hose attached thereto, said hose being three-ply, as shown at $h$ in the section. The projections B, as will be seen by inspection of Fig. 1, are closely juxtaposed and arranged in series on each side of the body of the clamp A, each one of the said projections being opposite another one of a similar kind, the two thus opposed forming what we term "a pair." They may be made of any number required, three pairs being shown in the drawings, and of any width measured longitudinally on the body of the clamp required for the requisite strength—say from a quarter to three-eighths of an inch; but we do not limit ourselves to any precise width or number of these projections, reserving the right to use as many or as few as are found necessary for the purpose of our invention. With three pairs each three-eighths of an inch in width it will be seen that an adjustability of one and one-eighth inch is obtainable, and that this range of adjustability may be increased by increasing the number of pairs. Neither do we confine ourselves to arranging the projections B in exactly opposite relation, as they can be arranged, though less advantageously, as shown in Fig. 3, the lugs B, numbered alike, then constituting a pair for the purposes of our invention.

In applying the clamp to couple the hose H to the coupling G, the band is bent into a circular form, as shown in Fig. 2, and the lugs or projections D and F are engaged by some clamping-instrument, which forces the clamp tightly down upon the outside of the hose, binding the same firmly upon the coupling, the clamp so tightened being held until a pair of the lugs B may be turned down over the outside of the body A, behind the projections E, as shown at B' in Fig. 2, which permanently secures the clamp to the hose and coupling. The elasticity of the material of which hose is made is sufficient to allow the band to be tightened, so as to take in another pair of projections B behind the projections E in case the clamp does not bear tightly enough upon the surface of the hose when brought to the proper position behind any pair of the projections which lie back of the projections E.

It will be seen when the clamping-instrument is used to tighten the clamp down upon the hose and the projections E are drawn into position to be engaged by a number of projections, B, bent down behind them, if the clamp does not bear tightly enough upon the hose, the clamping-instrument may be further tightened, so as to bring the next pair of the projections B into position for engagement with the projections E, and as there is no material space between the bases of the projections B where they join the body of the clamp, a much finer adjustment can be made than where wide spaces exist between said projections. Moreover, it will be seen that when the projections B are bent down behind the projections E the exact degree of tightness which has been obtained by the clamping-instrument is retained, whereas when hooks are used to engage the projections the clamping-instrument has to be drawn out enough to allow the point of the hooks to pass the projections before they can make their engagement with the lugs and before the clamp slacks off in making the engagement. By this means we obtain the object sought in our invention in a very cheap and effective manner, and produce a clamp for hose-couplings which is extremely easy to apply and certain in its application.

Having thus described our improvement, what we claim as our invention, and desire to secure by Letters Patent, is as follows:

1. A metallic clamp formed of a body, A, with a series of closely-juxtaposed projections, B, arranged in pairs on opposite sides of said body at one extremity, substantially as herein described, and projections E at the opposite end of said body for engaging one or other of the pairs of projections B when the clamp is bent into form and tightened upon the hose, substantially as herein specified, and for the purpose set forth.

2. The combination, with the body A of the clamp, having closely-juxtaposed projections B, arranged laterally in pairs and series on opposite sides of one extremity, and projections E on the sides of the other extremity, constructed and arranged as and for the purpose herein described, of the lugs or projections B and the projection F at the opposite end of said clamp-body, formed by turning down the end of said clamp-body, for applying the clamping-instrument to tighten the clamp upon the hose while the latter is being applied to a coupling, substantially as and for the purpose herein described.

GEO. SCHRADER.
JOSEPH SCHMITT.

Witnesses:
JNO. E. GAVIN,
LEICESTER ALLEN.